UNITED STATES PATENT OFFICE.

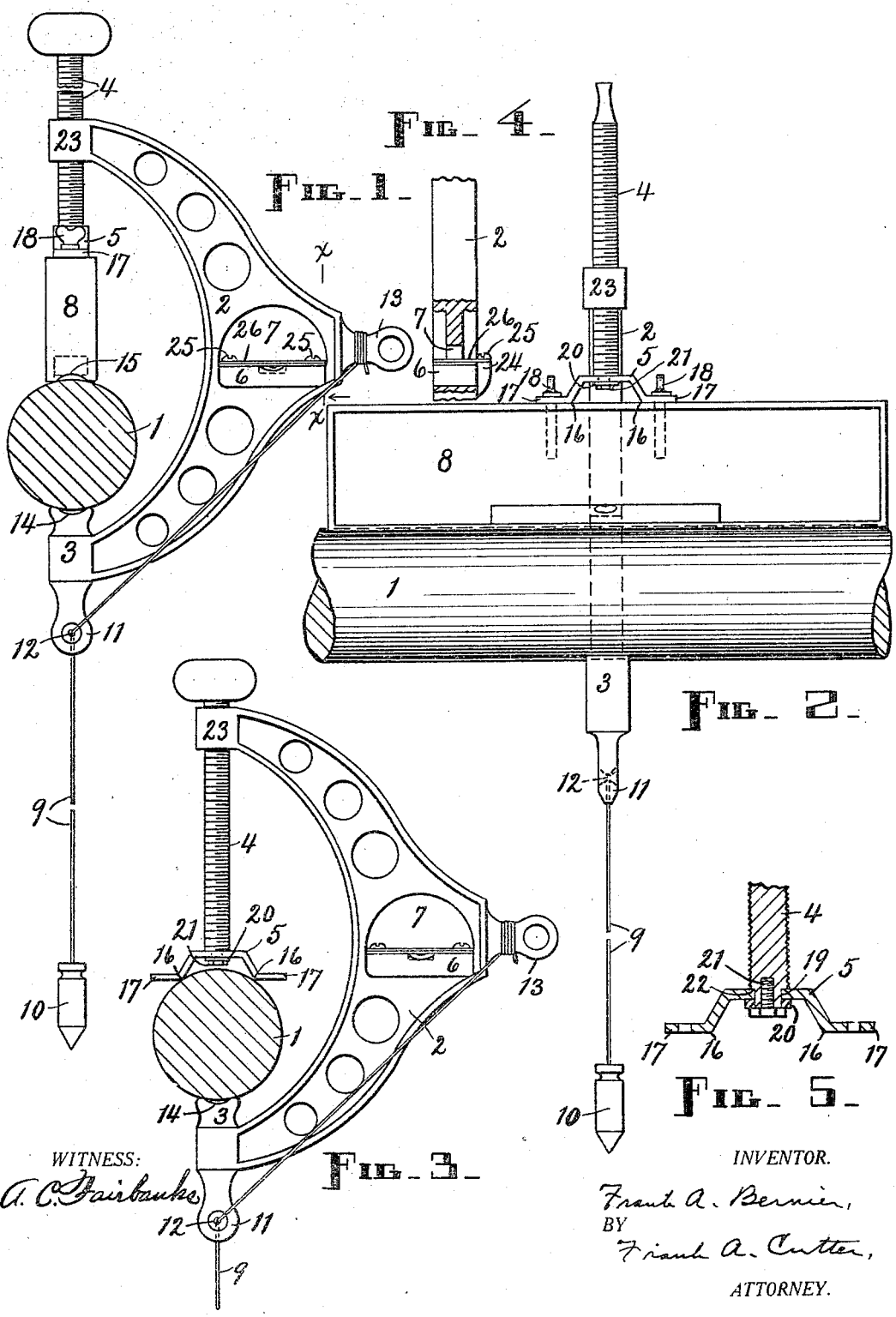

FRANK A. BERNIER, OF SPRINGFIELD, MASSACHUSETTS.

SHAFT-ALINER.

1,235,279. Specification of Letters Patent. Patented July 31, 1917.

Application filed February 7, 1917. Serial No. 147,233.

*To all whom it may concern:*

Be it known that I, FRANK A. BERNIER, a citizen of the United States of America, and a resident of Springfield, in the county of Hampden and State of Massachusetts, have invented a new and useful Shaft-Aliner, of which the following is a specification.

My invention relates to improvements in devices, commonly termed by millwrights shaft aliners, which are employed in "lining up" or leveling, or both, new shafting and shafting which is out of vertical and horizontal alinement or either, and said invention consists of a certain peculiar clamping bracket adapted to fit shafts of different sizes, and provided with a vertical-alinement level, a horizontal-alinement level, and means to connect or attach said last-named level with or to said bracket, all as hereinafter set forth.

In millwright work a straight line is marked on the floor in the same vertical plane with the true axis of a shaft to be alined horizontallly, or a cord is stretched between suitably placed "targets," to establish a guide, and a plumb is used in connection with such line or cord to position said shaft in absolute parallel relation throughout its entire length with said line or cord, as is well understood by those skilled in the art, and the primary object of my invention is to produce a comparatively inexpensive and simple device, applicable to a shaft of any size within the range of such device, and of any length, to coöperate with the aforesaid line or cord, for alining said shaft horizontally, and also to level or aline said shaft vertically when necessary, such device being provided with means whereby it can accurately, quickly and readily be attached to the shaft, and as quickly and readily detached from the same.

A further object is to provide the shaft aliner with convenient means of attaching and detaching the vertical alinement level, which means is capable of serving in the capacity of an upper clamp for a shaft in the absence of said level.

Other objects and advantages will appear in the course of the following description.

I attain the objects and secure the advantages of my invention by the means illustrated in the accompanying drawings, in which—

Figure 1 is a side elevation of a shaft aliner which embodies my invention in a practical form, showing the frame applied to a shaft and including the level for vertical alining purposes; Fig. 2, a front elevation of said aliner as featured in the preceding view; Fig. 3, a side elevation of the aliner applied, without said level, to said shaft; Fig. 4, a sectional detail taken on lines $x$—$x$, Fig. 1 looking in the direction of the associated arrow, and, Fig. 5, an enlarged detail in section of the lower terminal portion of the clamping-screw, and the parts and members attached thereto.

A portion of the clamping screw is broken out in the first view, also a portion of the plumb-line in said view and in Fig. 2, and the plumb is omitted from Fig. 3.

Similar characters of reference refer to similar parts throughout the several views.

In the first three views a shaft is represented at 1. The size of this shaft may vary to any extent within the range or scope of the aliner. It is understood that the length of the shaft is immaterial, so far as my invention is concerned, inasmuch as the aliner is applied to said shaft at as many points as may be necessary or desirable, usually at points adjacent to the hangers or bearings.

The aliner comprises a generally crescent-shaped frame 2 provided with a fixed clamping-jaw or saddle 3 at the bottom, that is, at the end of the lower horn of the crescent, a clamping-screw 4 tapped into and extending through a fixed head 23 at the top, that is, at the end of the upper horn of said crescent, a swivel clamping member or clip 5 at the base of said clamping-screw, a small level 6 located in an opening 7 in the central portion of the body of said frame, a large level 8, means to attach said last-named level to and detach it from said clip, and a plumb-line 9 with a plumb 10 at the lower end thereof.

The frame 2 has a projection or extension 11 below the saddle 3, through which extension is an opening 12, and said frame also has at the back a projection or extension 13. The plumb-line 9 passes through the opening 12 and is wound around the extension 13. Provision is thus made for conveniently unfastening the plumb-line 9, whenever it is desired to raise or lower the plumb 10, and then refastening said line in a manner to hold the same securely with said plumb suspended at the required height.

The axis of the clamping-screw 4, the axial center of the saddle 3, and the opening 12 are all in the same straight line, and at right-angles to such line is the level 6. Consequently, when the device is mounted on the shaft 1, in the manner presently to be described, and arranged so that the bubble in the level 6 is in the center of the sight-opening in such level, and when the plumb 10 hangs freely at the end of its line 9, the latter is a material continuation of the imaginary straight line mentioned above, and the relative position of the point of said plumb to a guide line or cord below shows how much if any said shaft is out of line horizontally.

The top of the saddle 3 is made laterally concave, as represented at 14, in order that the inner and outer edges of such top alone may contact with the shaft 1. Thus two points or places of contact with the underside of the shaft are provided, such places being on opposite sides of the transverse vertical central plane of the saddle 3 and equi-distant from said plane, and it is comparatively easy to bring said plane into coincidence with the corresponding plane of said shaft. The concavity 14 should have a radius that is less than that of any shaft to which the saddle 3 may be fitted, if the two places of contact are always to be operative, as will readily be seen. The bottom of the level 8 is similarly concaved at 15 and for the same reasons as in the other case. Likewise the clamping clip 5 has two shaft-contacting points or places 16—16, the same reasons once more applying.

The clip 5 is an angular member having two flat feet 17 which are adapted to rest on and be secured to the top of the level 8, by means of a pair of thumb-screws 18, said level being tapped through the top at points equi-distant from the transverse center, in the longitudinal center, to receive said thumb-screws. The clip 5 has a central opening therethrough to receive a projection 19 at the base of the clamping-screw 4—see Fig. 5. A washer 20 on the projection 19 under that part of the clip 5 that is mounted on said projection, and a bolt 21 tapped into said projection, with its head beneath said washer, hold said clip in place on, but permit the clip to be turned about, the projection. The projection 19 is smaller in diameter than the screw above, so that an annular shoulder 22 is formed, between which and the washer 20 the central portion of the clip is received.

An outwardly and upwardly extending lug or flange 24 is formed on one side of the frame 2, and to the top of this flange is fastened, by means of screws 25 tapped into said flange, a plate 26, such plate being secured to the top of the level 6 and overhanging on the side adjacent to the flange, as shown in Fig. 4.

In practice, when the aliner is to be used for alining a shaft, such as the shaft 1, in both directions, the level 8 is attached, by means of the thumb-screws 18, to the clamping clip 5, the clamping-screw 4 is turned up until there is room between the top of the saddle 3 and the bottom of said level for said shaft, said level is placed lengthwise on said shaft, and said clamping-screw is turned down until the shaft is grasped between said saddle and level. Subsequently the clamping-screw 4 is tightened so that the aliner can not turn on the shaft; care is exercised first, however, to have the axial center of the clamping members exactly vertical, the level 6 enabling this to be done without difficulty. The device including the level 8 is now firmly clamped to the shaft 1 in such a manner that the plumb 10 is available for horizontal alining purposes and said level for vertical alining purposes. The level 8 is clamped to the shaft directly over the saddle 3, as clearly illustrated in Figs. 1 and 2. After the shaft is alined at this point, the clamping-screw 4 is loosened and the aliner is moved to the next point, and so on until the entire length of shafting is in alinement.

When only horizontal alinement is required and it is not desired to use the level 8, the thumb-screws 18 are taken out and said level laid one side. Then the aliner is applied to the shaft in a similar manner to that previously explained, but in this instance the clamping clip 5 becomes the direct top engaging member for the shaft, as illustrated in Fig. 3, said clip being given a quarter turn on the projection 19, from the position which it occupied when fastened to the level 8, and thus brought into position crosswise of the shaft to engage the latter properly and serve in the capacity of a top clamp.

A more extended explanation of the manner of using my aliner is not deemed to be necessary.

Changes in the shape, size, construction, and arrangement of some or all of the parts of this device may be made without departing from the principle or sacrificing any of the advantages of the invention as defined in the appended claims.

What I claim as my invention, and desire to secure by Letters Patent, is—

1. The combination, in a shaft aliner, of a frame having a tapped head and a shaft-engaging member in spaced relationship, and an extension below said shaft-engaging member, the axis of said head continued passing through said shaft-engaging member, a level in said frame at right-angles to said axis, a clamping-screw in threaded engagement with said head, and provided at the base with a shaft-engaging member, and a plumb and plumb-line connected with said extension.

2. The combination, in a shaft aliner, of a frame having a projection to which a plumb-line may be fastened, a tapped head and a shaft-engaging member in spaced relationship, and a perforated extension below said shaft-engaging member, the axis of said head continued passing through said shaft-engaging member, a level in said frame at right-angles to said axis, a clamping-screw in threaded engagement with said head, and provided with a shaft-engaging member, a plumb-line passing through the perforation in said extension, and adapted to be fastened to said projection, and a plumb attached to said plumb-line.

3. The combination, in a shaft aliner, with a frame having a tapped head and a shaft-engaging member in spaced relationship, and an extension below said shaft-engaging member, the axis of said head continued passing through said shaft-engaging member, and a level in said frame at right-angles to said axis, of a clamping-screw in threaded engagement with said head, and provided at the base with a swivel clip adapted when positioned transversely of a shaft to coöperate with said shaft-engaging member to secure the aliner to said shaft, and when positioned parallel with a shaft to be attached to a level which may be mounted on said shaft, and a plumb and plumb-line connected with said extension.

4. The combination, in a shaft aliner, with a frame having a tapped head and a shaft-engaging member in spaced relationship, the axis of said head continued passing through said shaft-engaging member, and a level in said frame at right-angles to said axis, of a clamping-screw in threaded engagement with said head, a second level attached to the base of said clamping-screw and adapted to coöperate with said shaft-engaging member in securing the aliner to a shaft, and a plumb and plumb-line attachable to said frame.

5. The combination, in a shaft aliner, with a frame having a tapped head and a two-point shaft-engaging member in spaced relationship, the axis of said head continued passing through the transverse central plane of said shaft-engaging member, and a level in said frame at right-angles to said axis, of a clamping-screw in threaded engagement with said head, a second level having a two-point shaft-engaging part, and attached to the base of said clamping-screw, and a plumb and plumb-line attachable to said frame.

6. The combination, in a shaft aliner, with a frame having a tapped head and a shaft-engaging member in spaced relationship, the axis of said head continued passing through said shaft-engaging member, and a level in said frame at right-angles to said axis, of a clamping-screw in threaded engagement with said head, a swivel clip connected with said clamping-screw at the base thereof, a second level adapted to be mounted on a shaft, means to attach said clip to and detach it from said second level, either said second level or said clip when detached therefrom being adapted to coöperate with said shaft-engaging member to secure the aliner to said shaft, and a plumb and plumb-line attachable to said frame.

7. The combination, in a shaft aliner, with a frame having a tapped head and a two-point shaft-engaging member in spaced relationship, the axis of said head continued passing through the transverse central plane of said shaft-engaging member, and a level in said frame at right-angles to said axis, of a clamping-screw in threaded engagement with said head, a two-point shaft-engaging swivel clip connected with the base of said clamping-screw, a second level having a two-point shaft-engaging part, and attachable to said clip, means to attach said second level to and detach it from said clip, and a plumb and plumb-line attachable to said frame.

FRANK A. BERNIER.

Witnesses:
F. A. CUTTER,
A. C. FAIRBANKS.

Copies of this patent may be obtained for five cents each, by addressing the "Commissioner of Patents, Washington, D. C."